US008566947B1

(12) United States Patent
Sankruthi

(10) Patent No.: US 8,566,947 B1
(45) Date of Patent: Oct. 22, 2013

(54) METHOD AND APPARATUS FOR MANAGING AN ALERT LEVEL FOR NOTIFYING A USER AS TO THREATS TO A COMPUTER

(75) Inventor: Anand Sankruthi, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 635 days.

(21) Appl. No.: 12/273,249

(22) Filed: Nov. 18, 2008

(51) Int. Cl.
*G06F 21/00* (2013.01)

(52) U.S. Cl.
USPC ............... 726/25; 726/22; 726/23; 726/24

(58) Field of Classification Search
USPC ..................................... 726/22–25
See application file for complete search history.

(56) References Cited

U.S. PATENT DOCUMENTS

| | | | | |
|---|---|---|---|---|
| 7,360,095 | B2* | 4/2008 | Girouard et al. | 713/182 |
| 7,694,115 | B1* | 4/2010 | Porras et al. | 713/1 |
| 2003/0093514 | A1* | 5/2003 | Valdes et al. | 709/224 |
| 2003/0105973 | A1* | 6/2003 | Liang et al. | 713/200 |
| 2003/0167406 | A1* | 9/2003 | Beavers | 713/201 |
| 2004/0181685 | A1* | 9/2004 | Marwaha | 713/201 |
| 2004/0215975 | A1* | 10/2004 | Dudfield et al. | 713/201 |
| 2006/0031938 | A1* | 2/2006 | Choi | 726/25 |
| 2007/0006314 | A1* | 1/2007 | Costa et al. | 726/25 |
| 2007/0150579 | A1* | 6/2007 | Morin et al. | 709/224 |
| 2007/0299869 | A1* | 12/2007 | Clary et al. | 707/104.1 |
| 2007/0300301 | A1* | 12/2007 | Cangini et al. | 726/23 |
| 2009/0265456 | A1* | 10/2009 | Bouvier et al. | 709/224 |
| 2009/0271862 | A1* | 10/2009 | Allen et al. | 726/22 |
| 2010/0071063 | A1* | 3/2010 | Wang et al. | 726/23 |
| 2010/0083378 | A1* | 4/2010 | Cheswick | 726/23 |

* cited by examiner

*Primary Examiner* — Kambiz Zand
*Assistant Examiner* — Tongoc Tran
(74) *Attorney, Agent, or Firm* — Wilmer Cutler Pickering Hale and Dorr LLP

(57) ABSTRACT

A method and apparatus for managing alert level of the user computer is described. In one embodiment, the method for dynamically adjusting an alert level for notifying a user as to at least one threat to a computer includes applying heuristic information to environment data to identify vulnerability indicia regarding a computer, wherein the environment data comprises at least one usage statistic related to a user associated with the computer and determining an alert level based on the vulnerability indicia, wherein the user is notified of at least one threat to the computer in accordance with the alert level.

20 Claims, 3 Drawing Sheets

METHOD AND APPARATUS FOR MANAGING AN ALERT LEVEL FOR NOTIFYING A USER AS TO THREATS TO A COMPUTER

BACKGROUND

1. Field of the Invention

Embodiments of the present invention generally relate to computer security systems and, more particularly, to a method and apparatus for managing an alert level for notifying a user as to threats to a computer.

2. Description of the Related Art

Widespread use of data networks by small to large enterprises has resulted in an increase in computer system attacks by various malicious software programs (e.g., viruses, Trojan horses, worms and the like). Such malicious software programs may be transmitted (e.g., downloaded) to a computer system as an executable program, as an email attachment, as malicious HTML code on a web page, etc. For example, a particular malicious software program may be executed on a user computer in order to damage expensive computer hardware, destroy valuable data, consume limited computing resources and/or compromise sensitive information.

Various security software programs (e.g., anti-virus, anti-spyware, anti-phishing software programs) are often employed to detect the malicious software programs and prevent problems caused by the execution of such malicious software programs. The various security software programs may monitor a computer system for activities and/or code signatures associated with the malicious software programs and trigger an alert or provide various remedial measures, such as quarantining, repairing or deleting infected files.

The various security software programs currently utilize a wide range of techniques to detect and remove the malicious software programs from the infected computer systems. For example, a security software program may perform signature validation. As another example, the security software program may employ behavior blocking where a number of processes being executed on the computer systems are monitored in order to determine bad or suspicious behavior by any of the processes. Upon detection of any bad or suspicious behavior, the security software program may trigger an alert.

Nonetheless, bad or suspicious behavior does not necessary imply the existence of the malicious software programs. As such, the alerts triggered by this detecting technique may often misdiagnose non-malicious codes as malicious codes which results in generation of false positives. As such, an increase in a number of the alerts triggered by the security software program may increase a number of the false positives. Further, the false positives may trigger unwarranted remedial measures. For example, the false positives may result in temporary deactivation of critical computer resources, which can further be very costly.

Furthermore, the security software programs employ a conservative approach to notify the user of suspicious behavior where a rate of alerts is directly proportional to an increase in a number of false positives. In other words, as the number of alerts sent to the user increases, the number of false positives also increases. As such, the security software programs do not report certain suspicious behavior in order to reduce the number of false positives at the expense of genuine threats to the computer.

In addition, a subscription service (e.g., SYMANTEC LiveUpdate) may update a security software program to protect the computer systems from new malicious software programs. For example, the security software program may download new signatures for detecting the new malicious software programs. Unfortunately, a considerable amount of time is required to create the new signatures. As a result, the update of the security software program may be delayed due to an amount of time required to find solutions to the new malicious software programs.

Therefore, there is a need in the art, for a method and apparatus for managing an alert level for notifying a user as to threats to a computer from malicious software programs (e.g., a virus outbreak) or due to vulnerabilities associated with the computing environment.

SUMMARY OF THE INVENTION

Embodiments of the present invention comprise a method and apparatus for managing alert level for notifying a user as to threats to a computer. In one embodiment, a method for dynamically adjusting an alert level for notifying a user as to at least one threat to a computer includes applying heuristic information to environment data to identify vulnerability indicia regarding a computer, wherein the environment data comprises at least one usage statistic related to a user associated with the computer and determining an alert level based on the vulnerability indicia, wherein the user is notified of at least one threat to the computer in accordance with the alert level.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
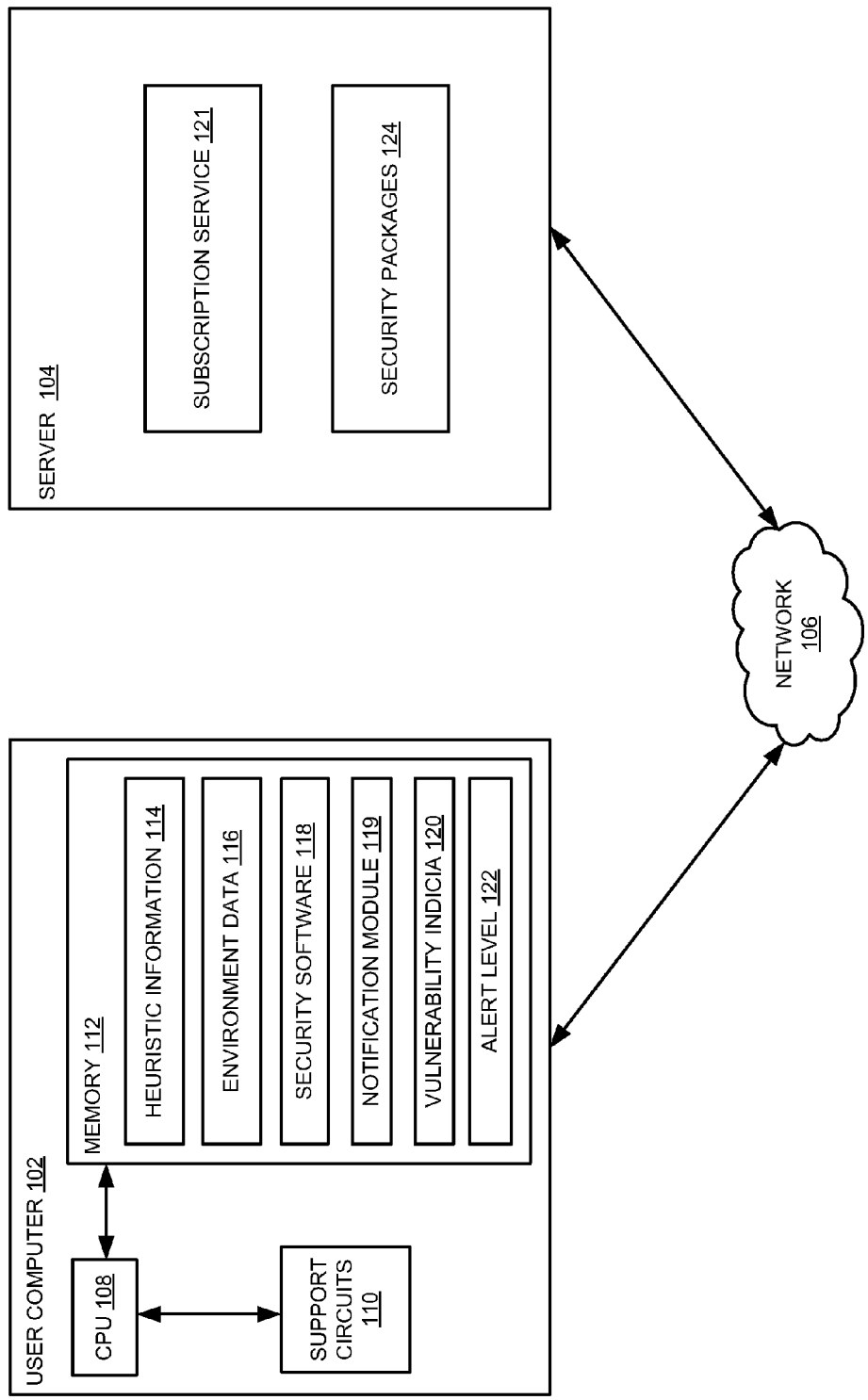
FIG. 1 is a block diagram of a system for managing an alert level for notifying a user as to threats to a computer from malicious software programs in accordance with one or more embodiments of the present invention.

FIG. 1 is a block diagram of a system 100 for managing an alert level for notifying a user as to threats to a computer from malicious software programs according to one or more embodiments of the present invention. The system 100 comprises a user computer 102 and a server 104, which are operatively coupled to each other through a network 106.

The user computer 102 is a type of computing device (e.g., a laptop, a desktop, a Personal Digital Assistant (PDA), a mobile phone and/or the like), such as those generally known in the art. The user computer 102 includes a Central Processing Unit (CPU) 108, various support circuits 110, and a memory 112. The CPU 108 may comprise one or more commercially available microprocessors or microcontrollers that facilitate data processing and storage. The support circuits 110 facilitate the operation of the CPU 108 and include one or more clock circuits, power supplies, cache, input/output circuits, and the like. The memory 112 comprises at least one of Read Only Memory (ROM), Random Access Memory (RAM), disk drive storage, optical storage, removable storage, and the like. The memory 112 includes various data, such as heuristic information 114, environment data 116, vulnerability indicia 120 and an alert level 122. The memory 112 further includes various software packages, such as security software 118.

The server 104 is a type of computing device (e.g., a laptop, a desktop, a Personal Digital Assistant (PDA) and/or the like), such as those generally known in the art. According to one embodiment, the server 104 includes a subscription service 121 for updating the security software 118 with the security packages 124. For example, the security packages 124 may include recently developed signatures for detecting a new malicious software programs. As such, the subscription service 121 communicates the security packages to the user computer 102 to be installed into the security software 118.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or intranet using various communications infrastructure such as Ethernet, WiFi, WiMax, General Packet Radio Service (GPRS), and the like.

According to various embodiments of the present invention, the heuristic information 114 defines a technique for evaluating the environment data 116 and determining the vulnerability indicia 120 associated with the user computer 102. For example, the heuristic information 114 may define a function or formula that is applied to the environment data to produce the vulnerability indicia 120. In other words, the heuristic information is used to determine if an extent to which the user computer 102 is vulnerable to threats from malicious software programs. As explained below, the heuristic information 114 may be applied to the environment data 116 in order to determine whether the alert level 122 is appropriate based on the vulnerability indicia 120 or requires an adjustment. For example, the alert level 122 may be adjusted if the user computer 102 has become more or less vulnerable due to the proliferation of one or more new malicious programs and/or one or more changes to the environment data 116 (e.g., installation of updates, service packs and/or the lack thereof).

According to various embodiments of the present invention, the environment data 116 includes information regarding a security level (e.g., low, medium and/or high) of the user computer 102. In one embodiment, the environment data 116 indicates a version of an operating system installed on the user computer 102. For example, the operating system may include MICROSOFT WINDOWS, APPLE MAC OS, LINUX and/or the like. The operating systems may further indicate a particular version, such as, MICROSOFT WINDOWS 98, MICROSOFT WINDOWS XP, MICROSOFT WINDOWS Vista and/or the like.

According to various embodiments of the present invention, the environment data 116 includes information related to geographic location of the user computer 102. For example, the user computer 102 may be located in a residential home or in a corporate office. The environment data 116 may further include information regarding types of applications installed on the user computer 102, such as, various media players, various games, anti-virus software, Office software and the like. The environment data 116 may further indicate versions of the various installed applications. In one embodiment, the environment data 116 may include versions of service packs installed on the user computer 102, firewall systems on the user computer 102 and the like.

According to various embodiments of the present invention, the environment data 116 includes information regarding usage statistics of the user computer 102. In one embodiment, the environment data 116 includes information such as a number of websites accessed by a user. For example, the user may access various websites, some of which may be illegitimate. In one embodiment, the environment data 116 may provide information related to a total number of threats, which have been detected in the user computer 102. Furthermore, the environment data 116 includes information regarding average time for which the user computer 102 remains connected to the network 106 (i.e., the Internet). In one embodiment, the environment data 116 may further indicate one or more types of e-mails received by the user, such as spam or emails from contacts which do not exist in the whitelists. The environment data 116 further includes information regarding a frequency of updates to the security software 118.

According to various embodiments of the present invention, the security software 118 may provide various software-based technologies that safeguard against a broad range of threats from the malicious software programs. In one embodiment, the security software 118 is installed on the user computer 102 and may include the various software-based protection technologies (e.g., anti-virus, anti-spyware, email scanning, anti-phishing, firewall, web-site authentication, rootkit and/or identity protection technologies) that detect treats from the malicious software programs and mitigates any damage. For example, SYMANTEC Norton AntiVirus provides antivirus and Internet worm detection and removal technologies to protect the user computer against the threats from such malicious software programs.

The security software 118 may utilize various detection techniques (e.g., behavior blocking, machine learning and heuristics) to identify various threats to the user computer 102 from the malicious software programs. For example, SYMANTEC Norton AntiBot uses active behavioral-based analysis to provide real-time protection against web robot (i.e., bot) attacks, block web robots from hijacking the user computer 102 and prevent identity theft. According to various embodiments of the present invention, the security software 118 is configured to monitor the user computer 102 and detect threats to the user computer 102. If a particular threat is detected, the security software 118 notifies the user as to the particular threat. The security software 118 may also quarantine, remove and/or fix the malicious software programs. In another embodiment, the security software 118 adjusts the alert level 122 in response to a change in the environment data 116 (e.g., installation of a new hardware and/or software, such as a new operating system, one or more new data storage devices and/or the like).

According to various embodiments of the present invention, the security software 118 identifies the vulnerability indicia 120 associated with the user computer 102. The security software 118 identifies the vulnerability indicia 120 of the user computer 102 by applying the heuristic information 114 to the environment data 116. In one embodiment, the security software 118 adjusts the alert level 122 for the user computer 102 in response to a change in the vulnerability indicia 120 (e.g., an increase or decrease in a number of received SPAM, an installation of a service pack for operating system software or an update to the security software 118 and/or the like). In another embodiment, the security software 118 further notifies the user as to the various threats to the user computer 102 from the malicious software programs in accordance with the alert level 122.

According to various embodiments of the present invention, the vulnerability indicia 120 of the user computer 102 are determined by applying the heuristic information 114 to the environment data 116. On the basis of the vulnerability indicia 120 of the user computer 102, the alert level 122 for the user computer 102 is determined. For example, the vulnerability indicia 120 may highlight that the user computer 102 utilizes an outdated operating system and infrequently updates anti-virus software. Hence, the user computer 120 is determined to be highly vulnerable to threats from malicious software programs. In another embodiment, if the user continues to exhibit careless activity (e.g., click on pop-ups arising in web browser windows), then the user computer 102 becomes more vulnerable to the threats caused by the malicious software programs. As another example, the user computer 102 is determined to be more or less vulnerable based upon a number of received SPAM emails. As such, if the number of received SPAM emails exceeds a pre-defined threshold, then the user computer 102 is more vulnerable. According to yet another example, if the user accesses websites other than common, whitelisted websites, then the user computer 102 is determined to more likely be highly vulnerable.

According to various embodiments of the present invention, the subscription service 121 may further store subscription plan details for the security software 118 installed on the user computer 102. The subscription plan details may include a license validity period, a payment mode (e.g., pre-paid or payments through credit card), a one-time fee charged for subscription and/or or any other security software related specifications.

According to various embodiments of the present invention, the alert level 122 is determined by the security software 118 based upon the vulnerability indicia 120 of the user computer 102. In one embodiment, the alert level 122 indicates one or more threats that are to be reported to the user computer 102 upon detection. For example, the alert level 122 may define a frequency for notifying the user computer 102 as to variety of suspicious activity (e.g., malicious behavior such as modifications to critical system data (e.g., registry settings, system files and/or the like), data transmissions with blacklisted websites and/or the like). Hence, the alert level 122 defines a sensitivity of the user computer 102 to various suspicious or malicious behaviors. In another embodiment, the alert level 122 may define a sensitivity level of the security software with respect to a particular suspicious activity or a group of suspicious activities. For example, if the sensitivity level for registry key modifications is increased, then the user is notified of each and every activity in which a registry key is modified.

In one embodiment, the alert level 122 of the user computer 102 may be classified into three or more alert levels (i.e., a high alert level, a low alert level, a medium alert level and/or the like). For example, in the high alert level, any suspicious activity being performed on the user computer 102 is considered to be a threat and reported to the user computer 102. According to another embodiment, the low alert level specifies that any suspicious activity confirmed to be a threat is to be reported to the user computer 102. Under the medium alert level, the user computer 102 is notified of the confirmed suspicious activity as well as any highly suspicious activity (e.g., accessing encrypted data, communicating with known phishing websites and/or the like).

According to various embodiments of the present invention, the subscription service 121 is configured to instruct the security software 118 in order to adjust the alert level 122 of the user computer 102. In one embodiment, the security software 118 interacts with the subscription service 121 and downloads the security packages 124. According to various embodiments of the present invention, the security packages 124 include instructions regarding adjustments to the alert level 122 of the user computer 102. In one embodiment, the alert level 122 of the user computer 102 may be adjusted to a high alert level in order to report any suspicious activity as a threat to the user computer 102 in response to an instruction from the subscription service 121. In another embodiment, the alert level 122 may be modified such as to override the alert level 122 for specific suspicious activities caused by a new malicious software program. In one embodiment, the security packages 124 may further include instructions to destroy or mitigate the new malicious software program and thereby, adjust the alert level 122 of the user computer 102.

Figure 2:
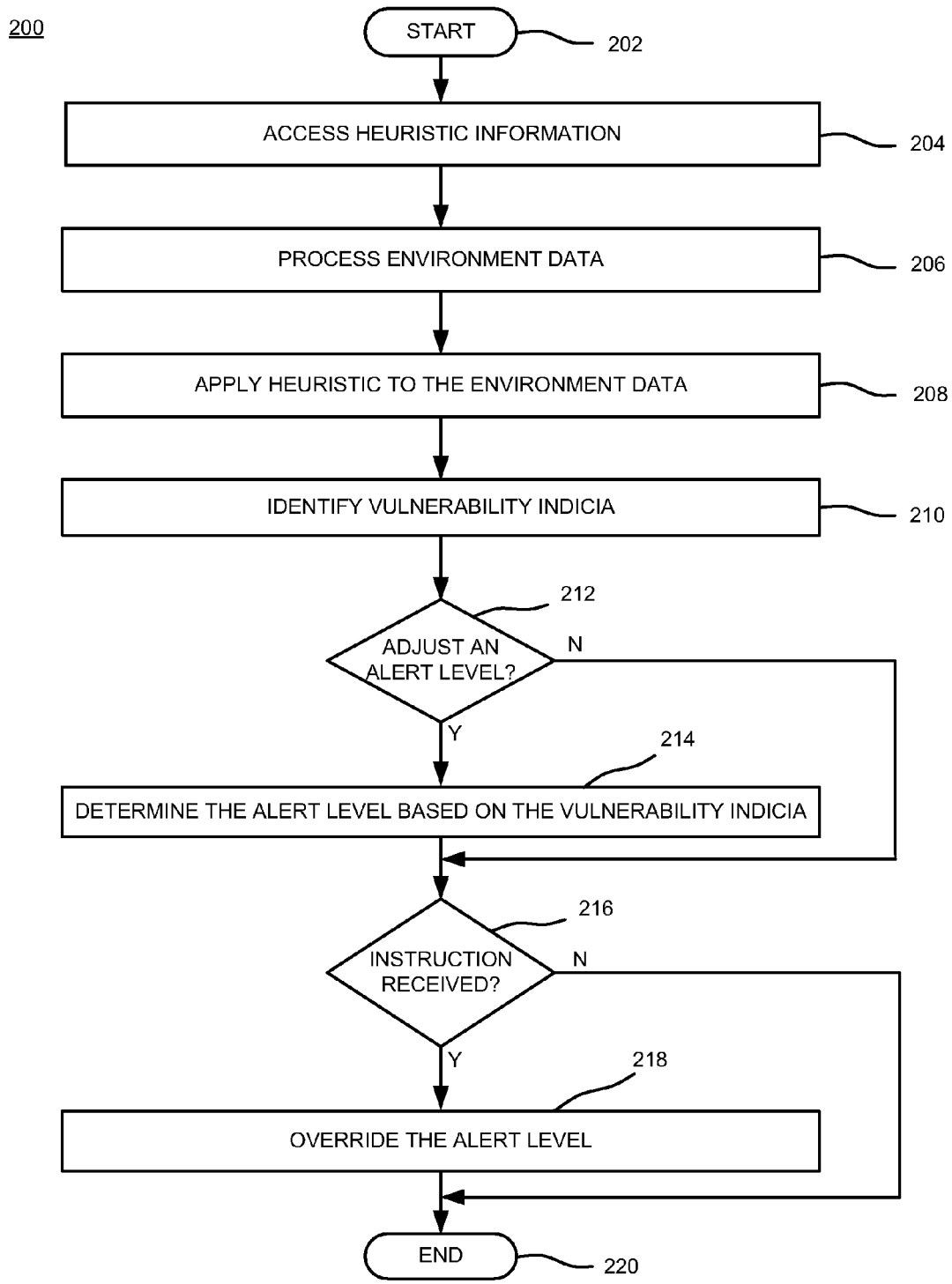
FIG. 2 is a flow diagram of a method for managing an alert level for notifying a user as to threats to a computer from malicious software programs in accordance with one or more embodiments of the present invention.

FIG. 2 is a flow diagram of a method 200 for adjusting an alert level of a user computer (e.g., the user computer 102 of FIG. 1) according to one embodiment. The method 200 starts at step 202 and proceeds to step 204, at which heuristic information (e.g., the heuristic information 114 of FIG. 1) is accessed.

At step 206, environment data (e.g., the environment data 116 of FIG. 1) is processed. For example, the environment data includes a number of times security software (e.g., the security software 118 of FIG. 1) is updated, an average online time for the user computer, a total number of detected malicious software programs and/or the like. At step 208, the heuristic information is applied to the environment data. At step 210, vulnerability indicia (e.g., the vulnerability indicia 120 of FIG. 1) are identified. For example, if the user computer infrequently updates the security software, then the user computer is highly vulnerable to the threats from the malicious software programs.

At step 212, a determination is made as to whether an alert level (e.g., the alert level 122 of FIG. 1) is to be adjusted. If, at the step 212, it is determined that no alert level is to be adjusted (option "NO"), then the method 200 proceeds to step 216. If, it is determined that the alert level is to be adjusted (option "YES"), then the method 200 proceeds to step 214. At the step 214, the alert level is determined based on the vulnerability indicia. At step 216, a determination is made as to whether an instruction is received by the security software from a subscription service (e.g., the subscription service 121 of FIG. 1). If, at the step 216, it is determined that no instruction is received by the security software (option "NO"), then the method 200 proceeds to step 220. If, it is determined that an instruction has been received by the security software (option "YES"), then the method 200 proceeds to step 218.

At the step 218, the alert level of the computer is overridden. In one embodiment, the alert level is overridden in response to the instruction received by the subscription service. According to various embodiments of the present invention, after a sudden outbreak of a new virus, a security package that includes one or more instructions regarding the new virus may be communicated to the security software 118 while a solution for the new virus is in development (e.g., by the SYMANTEC Response Team). For example, before activity-based or code-based signatures are distributed to the user computer, an instruction is sent to the security software to raise the alert level to report any suspicious behavior as a threat to the user computer. In one embodiment, if one or more behaviors or characteristics of the new virus are determined, then the alert level may be raised to report the one or more behaviors or characteristics as exhibited by the new virus. In another embodiment, if the solution for the new virus is tested and ready for deployment, a security package is communicated that include solution as well as an instruction to revert the alert level back to previous alert level. At step 220, the method 200 ends.

Figure 3:
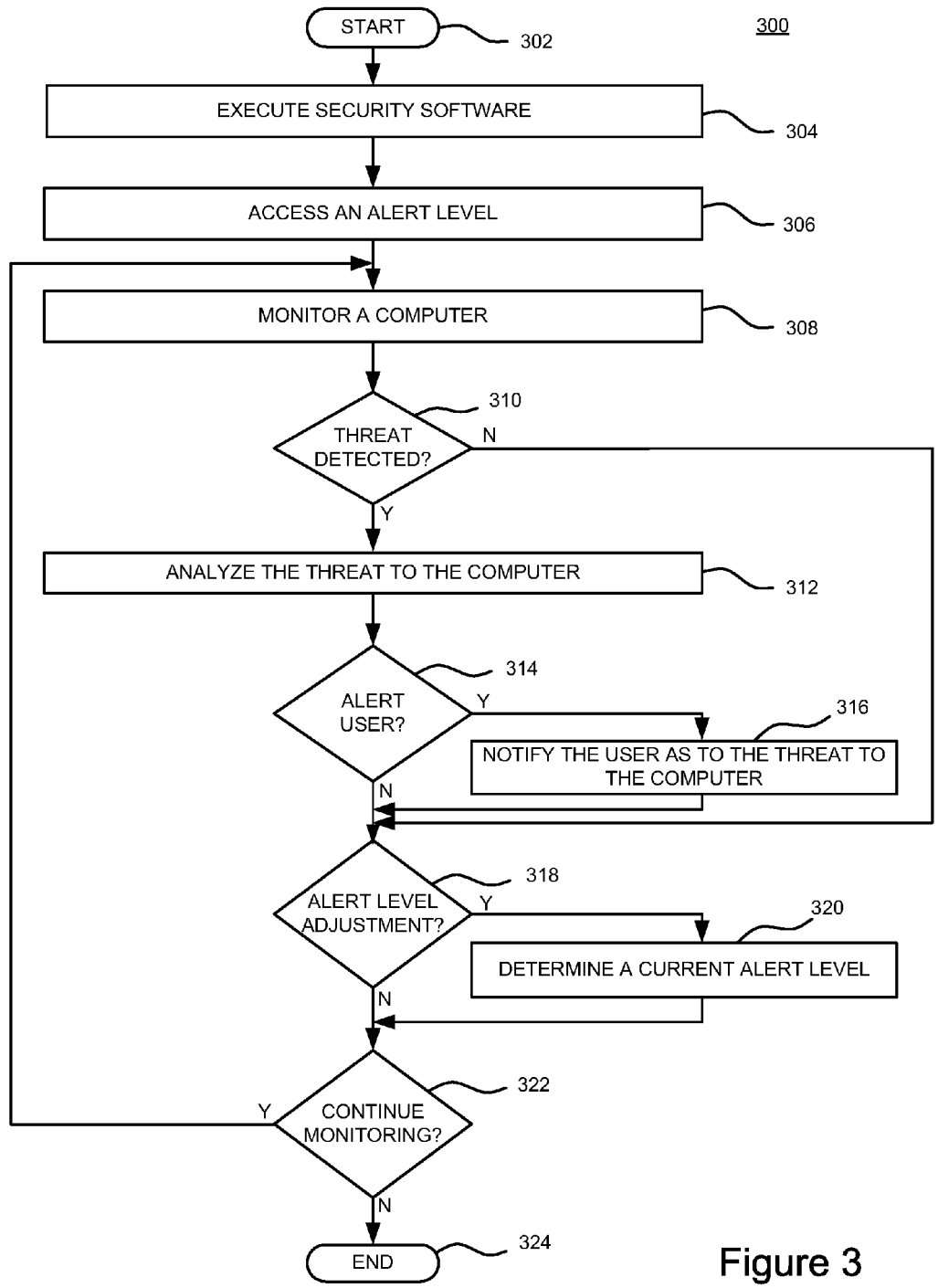
FIG. 3 is a flow diagram of a method for monitoring a user computer in accordance with one or more embodiments of the present invention.

FIG. 3 is a flow diagram of a method 300 for monitoring a computer (e.g., the user computer 102 of FIG. 1) according to one or more embodiments of the present invention. The method 300 starts at step 302 and proceeds to step 304, at which security software (e.g., the security software 118 of FIG. 1) is executed. At step 306, an alert level (e.g., the alert level 122 of FIG. 1) is accessed. At step 308, the computer is monitored.

The method 300 proceeds to step 310, at which a determination is made as to whether a threat to the user computer (e.g., suspicious activity performed by a resident malicious software program) is detected. If, at the step 310, it is determined that there is no threat to the user computer (option "NO"), then the method 300 proceeds to step 318. If, it is determined that there is a threat to the user computer (option "YES"), then the method 300 proceeds to step 312. At the step 312, the threat to the user computer is analyzed.

At step 314, a determination is made as to whether the user is to be alerted of the threat. If at the step 314, it is determined that the user is to be alerted (option "YES"), then the method 300 proceeds to step 316. At the step 316, the user is alerted as to the detected threat to the user computer. If, at the step 314, it is determined that the user is not to be alerted as to the detected threat (option "NO"), then the method 300 proceeds to the step 318.

At the step 318, a determination is made as to whether the alert level is to be adjusted. If, at the step 318, it is determined that the alert level is to be adjusted (option "YES"), then the method 300 proceeds to step 320. At the step 320, a current alert level is determined. If, at the step 318, it is determined that the alert level is not to be adjusted (option "NO"), then the method 300 proceeds to the step 322. At the step 322, a determination is made as to whether the monitoring of the user computer is to continue. If, at the step 322, it is determined that the monitoring of the user computer is to continue (option "YES"), then the method 300 returns to step 308. If, it is determined that the monitoring of the computer is not to continue (option "NO"), then the method 300 proceeds to step 324. At step 324, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for dynamically adjusting an alert level for notifying a user as to at least one threat to a computer, comprising:
　applying heuristic information to environment data to identify vulnerability indicia regarding a computer, wherein the environment data comprises at least one usage statistic related to a user associated with the computer;
　determining an alert level based on the vulnerability indicia, wherein the alert level is configured to be dynamically adjusted in response to at least one instruction from a subscription service; and
　notifying the user of at least one threat to the computer in accordance with the alert level.

2. The method of claim 1, wherein determining the alert level further comprises adjusting the alert level in response to a change to at least one of the environment data and the vulnerability indicia.

3. The method of claim 1, wherein the alert level defines a frequency for notifying the user of the at least one rate.

4. The method of claim 3, wherein determining the alert level further comprises adjusting the alert level in response to a determination that the at least one instruction from a subscription service has been received.

5. The method of claim 4, wherein processing the at least one instruction further comprises overriding the determined alert level in accordance with the at least one instruction.

6. The method of claim 1, wherein the alert level comprises at least one of a high alert level, a medium alert level and a low alert level.

7. The method of claim 1, wherein the vulnerability indicia comprises at least one of a number received SPAM emails, an outdated operating system and infrequently updated security software.

8. An apparatus for dynamically adjusting an alert level for notifying a user as to at least one threat to a computer, comprising:
　security software for applying heuristic information to environment data to identify vulnerability indicia regarding a computer and determining an alert level based on the vulnerability indicia, wherein the alert level is configured to be dynamically adjusted in response to at least one instruction from a subscription service and wherein the environment data comprises at least one usage statistic related to a user associated with the computer.

9. The apparatus of claim 8 further comprising a notification module for alerting the user as to at least one threat to the computer in accordance with the alert level.

10. The apparatus of claim 8, wherein the security software adjusts the alert level in response to a change to at least one of the environment data and the vulnerability indicia.

11. The apparatus of claim 8, wherein the alert level defines a frequency for notifying the user of suspicious activity.

12. The apparatus of claim 8, wherein the security software adjusts the alert level in response to a determination that the at least one instruction from a subscription service has been received.

13. The apparatus of claim 12, wherein the subscription service overrides the alert level using the at least one instruction.

14. The apparatus of claim 8, wherein the alert level comprises at least one of a high alert level, a medium alert level and a low alert level.

15. The apparatus of claim 8, wherein the vulnerability indicia comprises at least one of a number received SPAM emails, an outdated operating system and infrequently updated security software.

16. A system for dynamically adjusting an alert level for notifying a user as to at least one threat to a computer, comprising:
　a user computer, comprising:
　　security software for applying heuristic information to environment data to identify vulnerability indicia regarding the user computer and determining an alert level based on the vulnerability indicia, wherein the environment data comprises at least one usage statistic related to a user, and
　　a notification module for alerting the user as to at least one threat to the user computer in accordance with the alert level; and a server coupled to the user computer comprising a subscription service for communicating at least one security package to the security software, wherein the at least one security package comprises at least one instruction, and wherein the alert level is configured to be dynamically adjusted in response to the at least one instruction from the subscription service.

17. The system of claim 16, wherein the security software adjusts the alert level in response to a change to at least one of the environment data and the vulnerability indicia.

18. The system of claim 16, wherein the alert level defines a frequency for notifying the user of suspicious activity.

19. The system of claim 16, wherein the security packages comprises at least one instruction for adjusting the alert level, wherein the alert level is dynamically adjusted in response to a determination that the at least one instruction is received.

20. The system of claim 16, wherein the subscription service overrides the alert level using the at least one security package.

* * * * *